(12) United States Patent
Blair (10) Patent No.: US 7,574,000 B2
(45) Date of Patent: *Aug. 11, 2009

(54) SYSTEM AND METHOD FOR ANALYSING COMMUNICATIONS STREAMS

(75) Inventor: Christopher Douglas Blair, South Challey (GB)

(73) Assignee: Verint Americas Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/565,943

(22) Filed: Dec. 1, 2006

(65) Prior Publication Data

US 2007/0160190 A1 Jul. 12, 2007

Related U.S. Application Data

(63) Continuation of application No. 10/181,103, filed as application No. PCT/GB01/00129 on Jan. 12, 2001, now Pat. No. 7,203,285.

(30) Foreign Application Priority Data

Jan. 13, 2000 (GB) ................................. 0000725.1

(51) Int. Cl.
  *H04M 3/00* (2006.01)
  *H04M 5/00* (2006.01)
(52) U.S. Cl. .................................................. 379/266.1
(58) Field of Classification Search ............... 379/32.01, 379/32.02, 32.05, 265.03, 265.06, 265.07, 379/265.08, 265.14, 261–262, 266.1
See application file for complete search history.

(56) References Cited

U.S. PATENT DOCUMENTS 3,594,919 A 7/1971 De Bell et al.
3,705,271 A 12/1972 De Bell et al.
4,464,543 A * 8/1984 Kline et al. .................. 379/224
4,510,351 A 4/1985 Costello et al.
4,684,349 A 8/1987 Ferguson et al.
4,694,483 A 9/1987 Cheung
4,763,353 A 8/1988 Canale et al.
4,815,120 A 3/1989 Kosich
4,924,488 A 5/1990 Kosich
4,953,159 A 8/1990 Hayden et al.
5,016,272 A 5/1991 Stubbs et al.

(Continued)

FOREIGN PATENT DOCUMENTS

EP     0453128 A2    10/1991

(Continued)

OTHER PUBLICATIONS

"Customer Spotlight: Navistar International," Web page, unverified print date of Apr. 1, 2002.

(Continued)

*Primary Examiner*—Binh K Tieu
(74) *Attorney, Agent, or Firm*—Lawrence A. Aaronson, P.C.

(57) ABSTRACT

Methods are provided, a representative one of which involves: recording information associated with a communication; providing a graphical user interface, the graphical user interface being configured such that, responsive to a user input designating a portion of the communication, information recorded and corresponding to that portion of the communication is presented to the user; and displaying, via the graphical user interface, graphical indications of events occurring during the communication.

18 Claims, 4 Drawing Sheets

U.S. PATENT DOCUMENTS

| | | | |
|---|---|---|---|
| 5,101,402 A | 3/1992 | Chiu et al. | |
| 5,117,225 A | 5/1992 | Wang | |
| 5,210,789 A * | 5/1993 | Jeffus et al. | 379/127.01 |
| 5,239,460 A | 8/1993 | LaRoche | |
| 5,241,625 A | 8/1993 | Epard et al. | |
| 5,267,865 A | 12/1993 | Lee et al. | |
| 5,299,260 A | 3/1994 | Shaio | |
| 5,311,422 A | 5/1994 | Loftin et al. | |
| 5,315,711 A | 5/1994 | Barone et al. | |
| 5,317,628 A | 5/1994 | Misholi et al. | |
| 5,347,306 A | 9/1994 | Nitta | |
| 5,388,252 A | 2/1995 | Dreste et al. | |
| 5,396,371 A | 3/1995 | Henits et al. | |
| 5,432,715 A | 7/1995 | Shigematsu et al. | |
| 5,465,286 A | 11/1995 | Clare et al. | |
| 5,475,625 A | 12/1995 | Glaschick | |
| 5,485,569 A | 1/1996 | Goldman et al. | |
| 5,491,780 A | 2/1996 | Fyles et al. | |
| 5,499,291 A | 3/1996 | Kepley | |
| 5,535,256 A | 7/1996 | Maloney et al. | |
| 5,572,652 A | 11/1996 | Robusto et al. | |
| 5,577,112 A | 11/1996 | Cambray et al. | |
| 5,590,171 A | 12/1996 | Howe et al. | |
| 5,597,312 A | 1/1997 | Bloom et al. | |
| 5,619,183 A | 4/1997 | Ziegra et al. | |
| 5,696,906 A | 12/1997 | Peters et al. | |
| 5,717,879 A | 2/1998 | Moran et al. | |
| 5,721,842 A | 2/1998 | Beasley et al. | |
| 5,742,670 A | 4/1998 | Bennett | |
| 5,748,499 A | 5/1998 | Trueblood | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,825,869 A | 10/1998 | Brooks et al. | |
| 5,831,611 A * | 11/1998 | Kennedy et al. | 715/763 |
| 5,835,572 A | 11/1998 | Richardson, Jr. et al. | |
| 5,862,330 A | 1/1999 | Anupam et al. | |
| 5,864,772 A | 1/1999 | Alvarado et al. | |
| 5,884,032 A | 3/1999 | Bateman et al. | |
| 5,907,680 A | 5/1999 | Nielsen | |
| 5,918,214 A | 6/1999 | Perkowski | |
| 5,923,746 A | 7/1999 | Baker et al. | |
| 5,933,811 A | 8/1999 | Angles et al. | |
| 5,944,791 A | 8/1999 | Scherpbier | |
| 5,948,061 A | 9/1999 | Merriman et al. | |
| 5,958,016 A | 9/1999 | Chang et al. | |
| 5,964,836 A | 10/1999 | Rowe et al. | |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,057,841 A | 5/2000 | Thurlow et al. | |
| 6,058,163 A * | 5/2000 | Pattison et al. | 379/265.06 |
| 6,061,798 A | 5/2000 | Coley et al. | |
| 6,072,860 A | 6/2000 | Kek et al. | |
| 6,076,099 A | 6/2000 | Chen et al. | |
| 6,078,894 A | 6/2000 | Clawson et al. | |
| 6,091,712 A | 7/2000 | Pope et al. | |
| 6,108,711 A | 8/2000 | Beck et al. | |
| 6,122,665 A | 9/2000 | Bar et al. | |
| 6,122,668 A | 9/2000 | Teng et al. | |
| 6,130,668 A | 10/2000 | Stein | |
| 6,138,139 A | 10/2000 | Beck et al. | |
| 6,144,991 A | 11/2000 | England | |
| 6,146,148 A | 11/2000 | Stuppy | |
| 6,151,622 A | 11/2000 | Fraenkel et al. | |
| 6,154,771 A | 11/2000 | Rangan et al. | |
| 6,157,808 A | 12/2000 | Hollingsworth | |
| 6,163,607 A * | 12/2000 | Bogart et al. | 379/266.01 |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,252,946 B1 * | 6/2001 | Glowny et al. | 379/88.22 |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Puram et al. | |
| 6,301,462 B1 | 10/2001 | Freeman et al. | |
| 6,301,573 B1 | 10/2001 | McIlwaine et al. | |
| 6,324,282 B1 | 11/2001 | McIlwaine et al. | |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 | 4/2002 | House et al. | |
| 6,404,857 B1 | 6/2002 | Blair et al. | |
| 6,411,989 B1 | 6/2002 | Anupam et al. | |
| 6,418,471 B1 | 7/2002 | Shelton et al. | |
| 6,459,787 B2 | 10/2002 | McIlwaine et al. | |
| 6,487,195 B1 | 11/2002 | Choung et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,535,909 B1 | 3/2003 | Rust | |
| 6,542,602 B1 | 4/2003 | Elazar | |
| 6,546,405 B2 | 4/2003 | Gupta et al. | |
| 6,560,328 B1 | 5/2003 | Bondarenko et al. | |
| 6,583,806 B2 | 6/2003 | Ludwig et al. | |
| 6,606,657 B1 | 8/2003 | Zilberstein et al. | |
| 6,665,644 B1 | 12/2003 | Kanevsky et al. | |
| 6,674,447 B1 | 1/2004 | Chiang et al. | |
| 6,683,633 B2 | 1/2004 | Holtzblatt et al. | |
| 6,687,877 B1 * | 2/2004 | Sastry et al. | 715/512 |
| 6,697,858 B1 | 2/2004 | Ezerzer et al. | |
| 6,724,887 B1 | 4/2004 | Eilbacher et al. | |
| 6,738,456 B2 | 5/2004 | Wrona et al. | |
| 6,757,361 B2 | 6/2004 | Blair et al. | |
| 6,772,396 B1 | 8/2004 | Cronin et al. | |
| 6,775,377 B2 | 8/2004 | McIlwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,959,078 B1 | 10/2005 | Eilbacher et al. | |
| 6,965,886 B2 | 11/2005 | Govrin et al. | |
| 2001/0000962 A1 | 5/2001 | Rajan | |
| 2001/0032335 A1 | 10/2001 | Jones | |
| 2001/0043697 A1 | 11/2001 | Cox et al. | |
| 2001/0055372 A1 * | 12/2001 | Glowny et al. | 379/88.22 |
| 2002/0038363 A1 | 3/2002 | MacLean | |
| 2002/0052948 A1 | 5/2002 | Baudu et al. | |
| 2002/0065911 A1 | 5/2002 | von Klopp et al. |

| | | | |
|---|---|---|---|
| 2002/0065912 | A1 | 5/2002 | Catchpole et al. |
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2004/0100507 | A1 | 5/2004 | Hayner et al. |
| 2004/0165717 | A1 | 8/2004 | McIlwaine et al. |
| 2005/0135610 | A1 | 6/2005 | Malone-Lee et al. |
| 2006/0140389 | A1* | 6/2006 | Stuart et al. ............ 379/265.02 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unverified print date of Apr. 1, 2002, unverified cover date of Jun. 15, 1999.

"OnTrack Online Delivers New Web Functionality," Web page, unverified print date of Apr. 2, 2002, unverified cover date of Oct. 5, 1999.

"PriceWaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of AI in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, pp. 1-15 Web page, unverified print date of May 2, 2002.

Brusilovksy, "Adaptive Education Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs*," *Communications ACM* 38(7):27-39 (Jul. 1995).

O'Herron, "CenterForce Technologies CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical SKills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Unknown Author, "Long-distance learning," *InfoWorld* 20(36):7676 (1998).

Untitled, 10th Mediterranean Electrotechnical Conference vol. 1 pp. 124-126 (2000).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Bringing eQuality to Business".

Witness Systems promotional brochure for eQuality entitled "Building Customer Loyalty Through Business-Driven Recording of Multimedia Interactions in your Contact Center," (2000).

Aspect Call Center Product Specification, "Release 2.0", Aspect Telecommunications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation . . . (But Were to Sensible to Ask)*, PC world Online, Dec. 14, 1999.

Berst, *It's Baa-aack. How Interative TV is Sneaking Into Your Living Room*, The AnchorDesk, May 10, 1999.

Berst, *Why Interactive TV Won't Turn You On (Yet)*, The AnchorDesk, Jul. 13, 1999.

Borland and Davis, *US West Plans Web Services on TV*, CNETNews.com, Nov. 22, 1999.

Brown, *Let PC Technology Be Your TV Guide*, PC Magazine, Jun. 7, 1999.

Brown, *Interactive TV: The Sequel*, NewMedia, Feb. 10, 1998.

Cline, Déjà vu—*Will Interactive TV Make It This Time Around?*, DevHead, Jul. 9, 1999.

Crouch, *TV Channels on the Web*, PC World, Sep. 15, 1999.

D'Amico, *Interactive TV Gets $99 set-top box*, IDG.net, Oct. 6, 1999.

Davis, *Satellite Systems Gear Up for Interactive TV Fight*, CNETNews.com, Sep. 30, 1999.

Diederich, *Web TV Data Gathering Raises Privacy Concerns*, ComputerWorld, Oct. 13, 1998.

*Digital Broadcasting*, Interactive TV News.

*EchoStar, MediaX Mix Interactive Multimedia With Interactive Television*, PRNews Wire, Jan. 11, 1999.

Furger, *The Internet Meets the Couch Potato*, PCWorld, Oct. 1996.

*Hong Kong Comes First with Interactive TV*, Sci-Tech, Dec. 4, 1997.

*Interactive TV Overview TimeLine*, Interactive TV News.

*Interactive TV Wars Heat Up*, Industry Standard.

Needle, *Will The Net Kill Network TV?* PC World Online, Mar. 10, 1999.

Kane, *AOL-Tivo: You've Got Interactive TV*, ZDNN, Aug. 17, 1999.

Kay, *E-Mail in Your Kitchen*, PC World Online, 093/28/96.

Kenny, *TV Meets Internet*, PC World Online, Mar. 28, 1996.

Linderholm, *Avatar Debuts Home Theater PC*, PC World Online, Dec. 1, 1999.

Mendoza, *Order Pizza WhileYou Watch*, ABCNews.com.

Moody, *WebTV: What the Big Deal?*, ABCNews.com.

Murdorf, et al., *Interactive Television—Is There Life After the Internet?*, Interactive TV News.

Needle, *PC, TV or Both?*, PC World Online.

*Interview with Steve Perlman*, CEO of Web-TV Networks, PC World Online.

Press, *Two Cultures, The Internet and Interactive TV*, Universite de Montreal.

Reuters, *Will TV Take Over Your PC?*, PC World Online.

Rohde, *Gates Touts Interactive TV*, InfoWorld, Oct. 14, 1999.

Ross, *Broadcasters Use TV Signals to Send Data*, PC World Oct. 1996.

Schlisserman, *Is Web TV a Lethal Weapon?*, PC World Online.

Stewart, *Interactive Television at Home: Television Meets the Internet*, Aug. 1998.

Swedlow, *Computer TV Shows: Ready for Prime Time?*, PC World Online.

Wilson, *U.S. West Revisits Interactive TV*, Interactive Week, Nov. 28, 1999.

* cited by examiner

SYSTEM AND METHOD FOR ANALYSING COMMUNICATIONS STREAMS

CROSS REFERENCE TO RELATED APPLICATIONS

This application is a continuation of U.S. patent application Ser. No. 10/181,103 filed Oct. 21, 2002, now U.S. Pat. No. 7,203,285, which is a U.S. national stage entry of PCT/GB01/00129, which was filed on Jan. 12, 2001, which claims the benefit of and priority to GB0000735.1, which was filed on Jan. 13, 2000, each of which is incorporated by reference herein in its entirety.

TECHNICAL FIELD

The present invention relates to a system and method for analyzing communication streams.

DESCRIPTION OF RELATED ART

Currently many commercial entities perform substantial amounts of their business via telephone or Internet contact with their customers. The analysis of such contact can therefore help businesses to improve, the quality and efficiency of their services, and assist with customer retention and, ultimately, profitability. Attempts have been made previously to achieve such analysis in a satisfactory manner and to a satisfactory degree. For example, many businesses have, for some time, recorded some of their communications streams e.g. telephone calls between their staff and their customers. Traditionally this was done to satisfy regulatory requirements or to help resolve disputes.

More recently, the emphasis has moved towards the reviewing of these interactions from a quality perspective. This is intended to identify good and had aspects of particular calls with a view to improving the level of customer service given. Recently, for example, recording the activity on a PC screen has been undertaken to improve the completeness of the review procedure with the reviewer able to see how accurately staff are entering information received via the telephone.

Also, it has been known to employ Call Detail Recording (CDR) systems to prevent perceived abuse of telephone systems and to apportion costs to the department or individual making the calls.

Originally such records were printed out directly from the Private Automatic Branch Exchange (PABX) onto a line printer. Later, systems were designed to store this information in a database allowing more sophisticated reporting and searching for calls on the basis of one or more of the stored call details. More recently, Computer Telephony Integration (CTI) interfaces have been provided that give this information in real-time, during the call.

Further, several systems currently exist that use call recording in combination with CDR or CTI and a database application in order to perform routine monitoring of calls with the intention of identifying weaknesses in individual Customer Service Representatives (CSRs). Typically a small percentage of the CSR calls are reviewed and "scored" against a set of predetermined criteria to give an indication of the quality of that particular member of staff.

Within a call-centre environment, it should also be noted that rather than simply using standard PC office automation applications when dealing with customers, staff in most call centres use increasingly sophisticated applications that help them to handle the calls more efficiently and effectively. Helpdesk applications and telemarketing call scripting applications are examples of such applications. Most such applications share the following characteristics:
   (i) they guide the staff member through the interaction, either explicitly suggesting questions to ask or implicitly e.g. by presenting a form with various fields to be filled in with details to be gleaned from the customer; and
   (ii) the progress of the call is, to some degree, dictated by the answers given during the call.

As an example, a service call to a help desk may flow through the following stages:
   (i) take customer details and verify maintenance contract is up to date;
   (ii) take details of the problem being experienced; (iii) attempt to resolve using appropriate set of diagnostic questions;
   (iv) if not solved, agree schedule for engineer to visit; and
   (v) give customer a problem reference number.

Within each of the above main stages there will be one or more sub-stages e.g. (I) (a) caller's name (i) (b) zip code etc.

Current systems employed for CSR quality monitoring require the manual review of calls in order to determine a quality "score". This prohibits the review of more than a few percent of all calls and the accuracy of the human scoring process and its objectivity are at best questionable. When coupled with a small sample size of typically only a few calls per CSR per week, the resultant scores offer a limited degree of quality monitoring. Also there are only a few aspects of the call that allow for automated scoring. The most common such aspect is the call duration which, for a known telemarketing script, should be within a known range. A portion of the overall score (perhaps 5%) may be allocated to such an aspect of the call.

Call centre management seeks to handle calls as efficiently as possible yet take advantage of cross-selling and upselling opportunities whilst the customer is already on the line. To this end, the way in which calls are handled within the call centre is of critical importance to the overall efficiency and profitability of the operation. As the sophistication of call handling systems and processes increases; so the complexity of the call flow designs increases such that it is very difficult to fully test and exercise these "scripts" prior to, or even during, their full-scale deployment. Sophisticated scripts may require a hundred pages or more of documentation including the "call flow diagram" and the associated questions and forms presented to the CSR. With many hundreds or even thousands of possible paths through such a script, any one CSR will not have sufficient experience of many particular routes through the script to allow for the objective evaluation of the effectiveness or otherwise of, for example, the suggested way to handle a particular objection raised during a sale.

Current systems typically store details of each call in a relation database typically with one record of more or less fixed structure per call. These details may include indications of the type of call, the "completion code", or whether a particular option was chosen or not etc. More advanced systems cater for the cases where a single "call" actually contains more than one transaction (e.g. request a quotation for two different insurance policies). This is typically done by subdividing the call into two or more parts each of which then has a database record associated with it.

Existing systems use one or more database records per call and the identification of calls normally requires that the user determine in advance which aspects of the call's progress are to be stored. Timing information stored is often limited to total call duration. The relative, time between different points in the call is difficult to determine. Calls that "loop" through the same part of the script several times are not well described by a single database record.

It has also been appreciated that customers and potential customers generally much prefer a "warm call" to a "cold call" i.e. a call where the caller obviously has taken the trouble to find out about a customer's previous dealings with their business rather than merely selecting the name from a list without any knowledge of the particular customer's details; many of which may already have been given previously.

Many businesses now proactively call their customers on a regular basis to try and "cross-sell" or "up-sell" with other products that they have determined may be of interest to the customer.

However, currently, where a follow-up call is to be made as the result of a previous call perhaps made several months earlier there is often little information available to the CSR responsible for the follow-up call. For example, a routine call to all mortgage customers may include the question "Have you reviewed your life insurance cover recently"?. According to the answer given, the customer may be placed on a list for a follow up call the next time a new life insurance policy is launched. At the time of the original call, the CSR will likely do no more than tick a "Yes/No/Maybe" option.

When the customer is called some months later, all that the new agent knows is that the customer previously said they may have been interested and the factual details presented about the customer's previous purchasing history. They do not know exactly how or in what tone of voice the customer responded several months earlier.

Additionally, such systems are open to abuse by the CSRs as they may be rewarded, or at least measured, by the number of such follow-up leads they record. Hence there is a temptation for anything other than a point-blank "No" to be recorded as a "Maybe".

It is also acknowledged that, in order to improve business processes, train CSRs and identify problems, there is a desire to identify individual calls or sets of calls which are handled particularly well or badly or that highlight deficiencies, opportunities, trends or anomalies.

Existing systems limit the selection criteria to those that can be derived solely from call details. These use individual database records associated with each call to store data fields about each call. These are particularly inflexible and need to be designed prior to the query. For example, if a user identifies that they will want to search for calls where the "Help" key was pressed, they could tag each call with a binary flag and set this to true as the help key is pressed. A more sophisticated solution would be to use a time field and store the time at which the help key was pressed. However, if the user then wants to find calls where "Help" was pressed twice or more, this known previous database scheme proves inadequate.

When considering call-replay, and irrespective of the reason for wanting to replay a specific call, there is often a desire to listen to a particular section of a call rather than the whole call. For example, an insurance claims handler will want to confirm that a driver now known to have a previous conviction disclosed this when asked during the initial policy quotation. Being able to jump directly to the portion of the call where the customer was asked this question avoids the need to browse through the whole call. Alternatively, a mail-order company CSR needing to correct an invalid address would like to jump to the part of the original call where the address was given.

Current systems require users to either listen to the whole call or to jump around the call listening to snippets until they "home in" on the required section. This is time consuming and prone to error.

Further it has long been possible to perform automated speech recognition in an attempt to transcribe or at least to highlight key words within telephone conversations. The capabilities of such systems (accuracy, tolerance of natural conversation speed, cost effectiveness) have been gradually improving during recent years.

To obtain maximum accuracy, currently employed algorithms are very CPU and memory intensive. It is unlikely that many customers will be able to afford to deploy full recognition across all conversations they record.

Simply applying generic recognition to the whole of a conversation requires the recognition algorithm to infer the context and grammar from the conversation in order to refine its decisions as to which words it heard. This process is CPU intensive and less accurate than being explicitly told the current context of the conversation.

It will therefore be appreciated that the current schemes of communication streams having advantages over known such systems and methods.

The present invention seeks to provide a system and method for analyzing communication streams having advantages over known such systems and methods.

SUMMARY

According to one aspect of the present invention there is provided a system for communications recording and analysis including means for recording one or more communication streams, means for identifying the recorded streams, means for retrieving the content of said recordings by identifier tags and wherein additional real-time information relating to the progress of the said communication streams is recorded.

Preferably, the communication streams and associated progress streams are linked by means of a cross reference within respective call detail records in a database of recordings.

In one embodiment, the communication streams can be interleaved with the call flow recordings and a composite stream is recorded.

Advantageously, the progress information may be inferred from analysis, in real-time or later, of keystrokes entered at a computer/terminal handling the interaction.

Alternatively, the progress information may be inferred from analysis, in real-time or later, of computer mouse actions.

Yet further, the progress information may be inferred from analysis, in real-time or later, of internet traffic emanating from, or terminating at, any of a number of computers/terminals handling the interaction.

Additionally, the progress information may be inferred from analysis, in real-time or later, of the words and/or prosody spoken during the interaction.

It should be appreciated that the contents of the call flow data stream may be used to refine the recording and/or analysis of the main stream(s).

Preferably, retrieval of specific sets of recordings may be performed by selection from the call detail records describing each of the recordings and/or the presence, repeated presence or absence of specified events or call states.

Advantageously, the criteria may include relative or absolute timing information.

Further, the presentation of the content of individual recordings may be in the form of a graphical display including bars and/or pictures and wherein the location, colour and/or size of which may be determined by the recorded call flow recording.

In particular, the presentation of one or more call flow recordings may be in the form of a directed graph showing the progress of the calls through the various states and transitions.

Also, the position, colour, labelling, texture and other graphical attributes of the nodes and/or lines can be determined by the number of calls following that route; the time they spend in the various states and/or other attributes derivable from the call flow recordings.

Still further, the display can be populated, and the graphical attributes modified, in real-time to reflect the timing information recorded within the call flow recordings.

In particular, the speed of replay can be, varied, for example, including "paused", "forwarded" or "reversed" at any rate including "single-step" mode.

Also, the set of call flow recordings may be refined by selecting, for example, via a double-click, a specific transition as discussed further later.

Advantageously, specific nodes and/or transitions can be highlighted according to automatically or manually defined rules so as to draw attention to the presence or absence of particular call flow routes.

The invention is advantageous in that the ability to track the progress of the call through the various stages allows more criteria to be subsequently scored automatically and hence objectively. Since computer-scoring can be easily and cost effectively achieved, it can be performed economically on a much larger sample of the calls—often the full 100%. For example, the time spent taking customer details should be within allowed ranges. Calls that did not result in the sale of product "X" should not have spent more than t seconds trying to sell this product before moving on to other propositions. Calls should not occur where the customer had to go back and re-enter details that should have been picked up earlier. Such a system allows perhaps 20-30% of the overall quality "score" to be determined automatically and therefore objectively and across all calls. This gives much better statistical significance with less manpower.

With regard to call flow design and call centre management, the invention can for example:

present N examples of calls following a specific path through the call flow script e.g. a rarely exercised branch; and further filter these calls according to more traditional call detail records e.g. "Service calls for Model XYZ that ended without problem resolution"

Having selected the set of calls of interest, these are then presented to the user and this can allow them to:

review just a specified section of the call (e.g. answer to question 143) without having to dip into the whole call to determine the appropriate part of the call;

review the whole call so as to hear the required section in context; and see the timing information associated with the calls e.g. how long spent in the specified section; how long between start of sales pitch and this section etc.

Turning now to the personalisation of calls, the invention can advantageously allow the few seconds of response to the relevant question to be retrieved efficiently without the user having to listen to the rest of the call. Using this feature, two strategies can be adopted. First, all of the responses to the question can be reviewed by a dedicated individual or team prior to the campaign getting underway.

As they listen to all of the responses, they can (a) prioritise the customers from most to least likely to buy and hence choose which ones will eventually be called and (b) ensure that the script that is to be used when the campaign starts includes answers to the issues likely to be raised. Hence they can improve the effectiveness of the campaign and reduce the number of wasted calls that will be made. Note that feature (a) above requires all responses to be listened to, whilst feature (b) only requires that a statistically significant sample be reviewed.

Secondly, during the campaign, agents may be presented with the previous response either in audio form or in textual form (manually or automatically transcribed). The former gives them the tonal and emotional content of the response but is less practical where autodiallers are used to present calls to CSRs as soon as the customer answers. Either approach lets them speak to the customer from a position of advantage, knowing exactly how they reacted to the question when last asked. Presenting the previous response first would allow the CSR to determine whether it is worth placing the call or not.

By recording the detailed progress of the call along with the call details and call content, the system advantageously allows the user to identify sets of "interesting" calls. Such calls might be those exhibiting the presence or absence of certain events within the call e.g. CSR requested "help" during the quotation process. This could identify CSR specific training needs or areas where all staff experience difficulty that could be improved.

Alternatively, or in addition, where one product was purchased but details of others were also given, it might be worth calling the customer soon to try again to sell them these other products.

Also, where the CSR had to return to a previous part of the script, the reason for this can be considered. For example, was a question ambiguous, a mistake made or did the customer change their mind?

Further, where less than 5 seconds was spent in the "confirmation" screen where customers should have the small print explained to them, this could suggest that the CSR was rushing on to the next call too fast.

Of course, poor typing skills might be indicated by excessive corrections and slow data entry.

Efficient replay of calls, can advantageously be achieved by recording the detailed progress of the call along with the call details and call content so that the system allows the whole call to be shown on a Graphical User Interface (GUI) with graphical indications of the current state of the call and significant events within the call. The user can then choose which section(s) of the call to play by clicking on the appropriately marked points. Also, required segments of the call to be presented in isolation and played individually or one after the other.

The present system, through monitoring and recording the progress of the call along with the audio content of the call, advantageously allows speech recognition algorithms to be directed at only those sections of conversations where maximum value is likely to be obtained. For example, no interpretation of the speech is undertaken whilst the customer's address is being taken. Likewise, interpretation can be concentrated on sections where sales objections are being handled or likely to be handled. Further, the algorithms can be directed in their selection of likely words according to the context of the conversation. For example, if a CSR has tabbed to the "Destination" field on screen, the customer is therefore more likely to have said "Paris" than "Pairs". Also, the algorithm can be directed as to the likely speaker—whether CSR or customer. That is, where independent transmit and receive audio streams are not available, the progress through the call can be used to identify which speaker is most likely to be talking.

The capabilities described above also allow the system to be used for the following additional and advantageous purposes. Usability analysis can determine how many keystrokes/mouse clicks were required to perform the most common functions and also identify the most common functions. Testing and Verification can also be achieved and used to find any calls where an order was taken that had not previously taken the customer through the required explanatory text thereby identifying an invalid path through the call flow script. CSR Quality Monitoring allows for the identification of those CSRs that spend more, or less, time than expected in specific sections of the call flow process or that follow certain paths through the call flow more or less often than the norm.

BRIEF DESCRIPTION OF DRAWINGS

The invention is described further hereinafter, by way of example only, with reference to the accompanying drawings in which.

DETAILED DESCRIPTION

Figure 1:
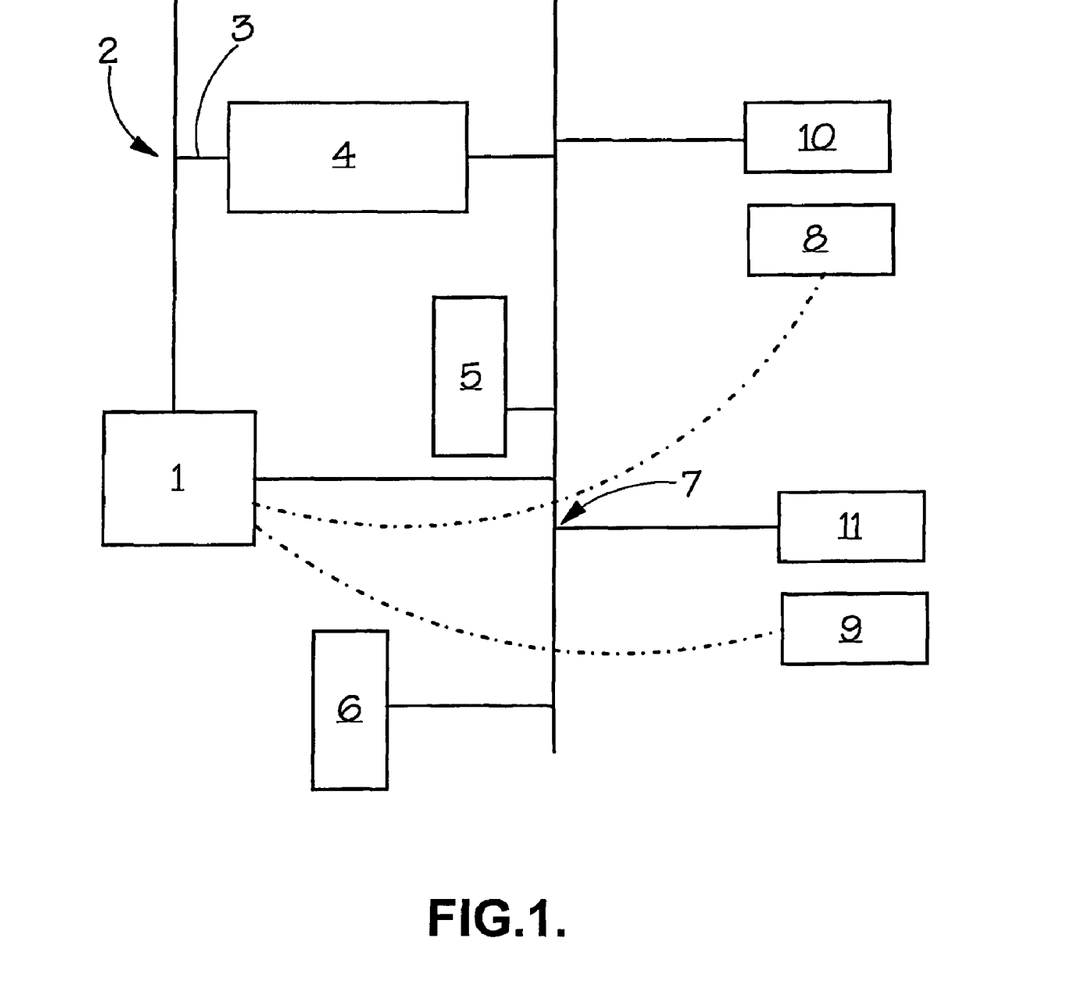
FIG. 1 is a block diagram of a recording and analysis system embodying the present invention.

Turning first to FIG. 1, one or more datastream recorders 4 are connected to speech transmission circuits 2 which in turn are typically connected to a Private Automatic Branch Exchange (PABX) or similar telephony switching system 1. Connection is achieved by means of a high impedance tap 3 which does not impact the normal use of the speech paths but also allows the recorder to monitor the signals on the paths.

The recorders 4 are also connected to a local area network' such as an ethernet (7) over which they communicate with other components of the system and can receive data for storage along with the voice data that they are recording from the speech paths (3). This data can be provided by any application on the network such as central business applications running on servers 6 or on an end user's desktop 10.

A server 5 consolidates details of all calls recorded by the recorders 4 which may be scattered across a local or wide area network and maintains a central database of "call records" which can be searched using standard SQL techniques. This also maintains details of the current location of removable media and the calls they contain.

Also running on a server 5 as part of the recording system is typically an application, for example UNIFY, which interprets Computer Telephony Integration (CTI) data from the telephony switch 1. This information is used to control the recorders 4 and indicate when to start and stop recording on both the speech and data channels. This information is also used to "tag" the calls with information regarding the call, such as which extension 8 the call was directed to. The recording of the data streams can also be controlled by this application and these too can be tagged with additional detail, such as which desktop 10 they relate to. Additionally, data stream recordings can be tagged with the identifier of the speech call that is in progress on the same desktop. For example, data from desktop 10 would be tagged with the identifier of the extension 8 on that desktop.

The voice and data calls that have been recorded can be retrieved by applications running on PCs on the network 11. These applications search the call-details database held on the server 5 to determine which call(s) they wish to replay and where these calls are currently held. The call content is then requested from the recorder holding the disk, tape or optical media on which it has been stored.

The following components of an overall system are currently available and are used as an underlying platform on which the specific enhancements used to provide the benefits described above can be deployed.

Multimedia Stream Recorders

Figure 2:
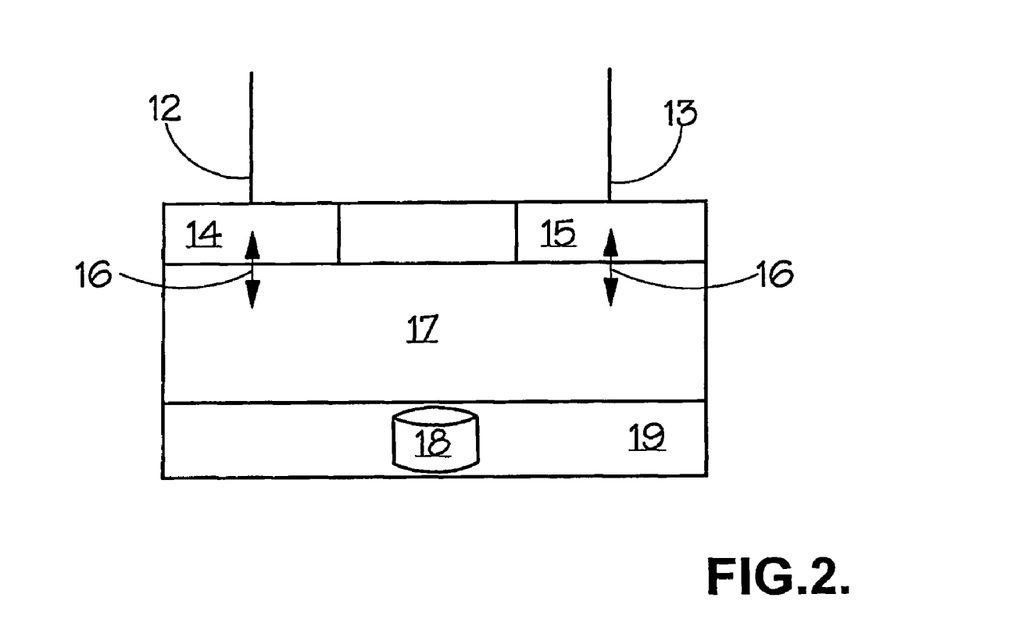
FIG. 2 is a functional block diagram of a recorder such as that in FIG. 1.

The recorder (4) is an example of a multi-channel voice recorder capable, of storing up to 128 conversations simultaneously. FIG. 2 shows the relevant details of the recorder. The speech signals are presented via a high impedance tap 12 and are typically compressed by an appropriate line interface card 14. At regular intervals the blocks of data to be stored are passed via the internal data recording interface 16 for indexing and storage to hard disk 18, or optionally, Digital Audio Tape (DAT) media for longer term archive. Calls can be "tagged" with arbitrary data fields describing the call and subsequently retrieved for replay or analysis. In addition to recording voice calls, the recorder can record data streams representing arbitrary communication types. Examples include PC screen capture recordings, messages for display on underground trains in-cab displays etc. These are typically presented as Internet Protocol (IP) packets via an ethernet cable 13 connected to an appropriate Network Interface Card (NIC) 15. The contents of these packets are passed through the same internal storage API 16 for storage to disk.

Computer Telephony Integration (CTI) Control and Tagging

The UNIFY component mentioned above is used to interpret one or more data streams typically provided by telephony switches, Automatic Call Distributors (ACDs) or applications within a call centre. By passing the information flows from these and applying customers defined rules, the UNIFY component will control the recorders to start, stop, pause, resume or break recordings on specified voice and/or data channels and/or to "tag" recordings, current or past, with specified data. These data fields ultimately form part of that recording's call detail record and can later be used to search for it.

Enterprise-Wide Recording and Retrieval Services

E-Ware is an example of a suite of NT 4.0 applications which manage one or more recorders to provide, across the customer's local or wide area network, an enterprise-wide set of recording and retrieval services. Application Programming Interfaces (APIs) provide access to recording control, configuration, status monitoring, search and retrieval mechanisms. The system consolidates the call detail records from all the recorders in the system into a central, open relational database allowing queries of arbitrary complexity to be performed using SQL. Additionally, the system records the contents and current location of all removable media to which calls have been recorded.

Data Recording System

One of the APIs of systems such as E-Ware provides for data recording capabilities and can be used by screen capture mechanisms.

Figure 3:
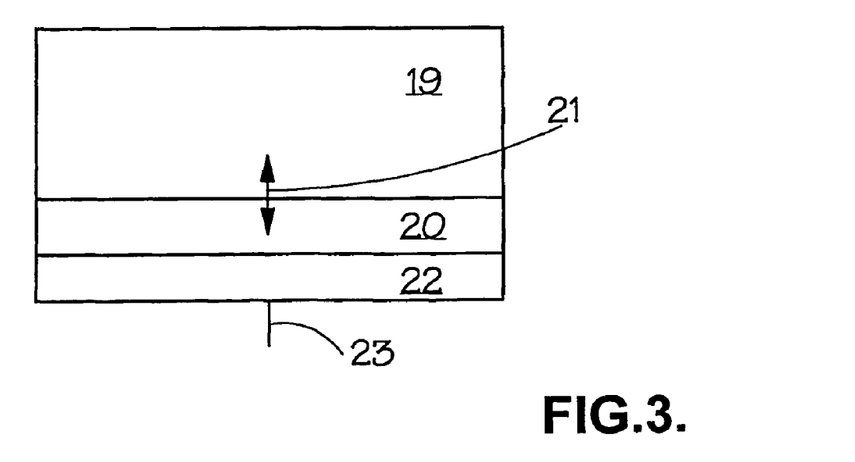
FIG. 3 is a functional block diagram of an Application Programming Interface (API) for use within an embodiment of the present invention.

The generic data recording API 21 is implemented for example by Eware2DR.DLL on Windows platforms and allows applications 19 to:
- register data streams as being available for storage;
- start and stop recordings on such data streams with the data being transferred across the network 23 via IP packets formed by an IP protocol stack 22 and ultimately stored on the recorders (4);
- provide their own timing information within the data stream supplied or have the system automatically package the data inside a protocol that adds time information at the required level of accuracy and granularity.

Replay Application

Windows applications such as "Replay Studio" can be provided that allow a user to:
- specify search criteria and perform searches to select a required set of call details from the central database;
- view the results of these searches in tabular and/or graphical formats;
- retrieve the contents of selected calls from the recording system for delivery to a local or shared cache area for subsequent replay; and
- replay one or more selected calls in a way appropriate to the type of call.

Examples are voice calls played via a soundcard and screen capture calls replayed in an on-screen window.

The application consists of an ActiveX framework into which additional data visualisation and replay mechanisms can be added to support new call types.

Call Flow Recordings (CFRs)

The particular features related to this embodiment of the invention are as follows. The main purpose of these enhancements is to provide a Call Flow Recording (CFR) that details—to the level of detail required for a given application—the progress of a call through the system. This CFR is not a database record but is actually a recording of a real-time data stream that allows the progress of the call to be reconstructed including both the route it took through the call handling process potentially down to the individual keystrokes entered—and when each step occurred.

These CFRs are stored within the generic recording system as "calls" of a new, well-known, Format type. This allows the retrieval and replay tools to recognise them and display them appropriately as opposed to trying to replay them as audio calls. The format identifier used is chosen to be in the range reserved for variable bit rate streams.

These CFRs are tied to the other components of the call, such as voice recording and screen content record, by use of cross-reference fields within their call detail records. Each CFRs call detail record includes the globally unique reference number of the "parent" call—typically a voice recording—to which it refers.

Additionally, "Parent" and "Child" flag fields can be used within the call detail records to alert applications to the fact that the voice call in question has one or more associated "calls" and, conversely, that the CFR has a related parent call and should not be viewed in isolation.

An alternative embodiment merges the context or progress information with the main recording so that the recorded data stream is an amalgam of the original plus the state information. A simple packetisation protocol allows the combined stream to be decoded into blocks of original and additional state information. This packetisation protocol may be further extended so as to include many different data streams within the single file. Any one or more of these streams may be extracted from the whole for subsequent analysis or replay.

Explicit Context Notification

Where applications involved in the progress of calls through the call centre are required to explicitly advise the recording system of the call's current state, this can be achieved by using an API which is layered on top of the generic data recording API. This "Call Flow Recording API" (CFR-API) provides the following functionality:
- it advises that the call is entering stage N, and offers user definable parameters P1 . . . Pn associated with this transition which are typically the name of the stage;
- it advises that the call is leaving stage N, and offers user definable parameters P1 . . . Pn associated with this transition which are typically the name of the stage; and
- it advises that the event E that is occurring e.g. a sale being made, and offers user definable parameters P1 . . . Pn associated with this transition, for example the value of the sale).

It should be noted that several levels of detail can be stored since calls can enter multiple stages without leaving a higher level one. For example, a sales call may generate the following calls to the API as it is handled:

entering Customer Identification Stage;
        entering Name Determination Stage;
            entering Surname Determination Stage;
            leaving Surname Determination Stage;
            entering FirstName Determination Stage;
                entering HelpScreen;
                leaving HelpScreen;
        leaving FirstName Determination Stage;
        leaving Name Determination Stage;
        entering Address Determination Stage; and
        leaving Address Determination Stage Implicit Context Determination In some cases it may be that not all of the applications involved in the handling of calls will be enhanced to provide the above-mentioned explicit notification of call progress. In such cases it may be necessary to infer the progress of the call from other sources such as screen capture, network (e.g. 'web') traffic and/or speech analysis of the voice records.

In such cases, these other data streams may be used as more or less satisfactory proxies for the missing or incomplete call flow recording. Three examples of how call progress can be inferred are given below.

These inferred call flow elements may be analysed in real time and merged into the overall call flow recording or may be determined at a later date by retrieving the data recording from which they are to be extracted.

First, the progress can be inferred from the key-strokes entered. As the entry of data via the keyboard is such a common and essential part of most call handling, keystrokes can be, by default, recorded as an integral part of the call flow recording for a given workstation. This is performed using standard Microsoft Windows "hooks" that allow applications to intercept all keystrokes. The related data is then combined into the same recording as the explicit notifications. In effect, these provide the lowest level of granularity within the call flow recording, for example, appearing as:

entering FirstName Determination Stage;
        KeyHit="F1";
        entering HelpScreen;
            KeyHit="Esc";
            leaving HelpScreen;
            KeyHit="T";
            KeyHit="o";
            KeyHit="m"; and
        leaving FirstName Determination Stage.

The second means of inferring call progress relates to mouse clicks. As with keystrokes, mouse clicks and mouse movements' can be sensed by default and inserted into the call flow recording. In addition to the basic action being performed, the co-ordinates on screen and as much detail as possible about the underlying control or application are recorded.

Thirdly, although determining call flow by analysing the display on screen can prove quite complex and unreliable, in some cases it can prove advantageously simple and precise. For example, where screen capture is performed via Graphical-Device-Interface (GDI) call interception, an "Order Entry" stage may be defined as when focus is placed on the window with the caption "Order Processing System".

Fourthly, whilst the discussions above have focused primarily on voice calls, the same principles and methods apply to visits by customers to a web site. The progress of the visitor around the web site and the analysis of the activities they are engaged in, such 'as browsing and completing payment details, can be stored in exactly the same way as the progress of the voice call is tracked. In these cases, the web server may give explicit notification of call progress and/or this may be inferred from the web traffic being exchanged between the server and the visiting customer.

Finally, where speech recognition software is deployed, either in real-time, or later on the retrieved recordings, the words that it recognises can be treated as a further, albeit "fuzzy", means of determining the progress of the interaction. For example, recognising "Visa" gives a good indication that payment details are under discussion.

Real-Time Control of Recording

The architecture arising from the present invention allows for data streams to be recorded and/or acted upon to control the real-time actions of the system through the aforementioned UNIFY call control component.

The call progress streams can therefore be treated as both a stream to be stored and a stream to be acted upon. Using the parsing mechanisms inherent within UNIFY, specific portions of the call that will start, stop, pause, resume, break or tag the recordings of the main communications streams can be identified.

Search Mechanisms

Customizable forms are provided with which the user can specify the parameters and criteria that are to be used to select a set of calls for analysis and visualisation. The user may then choose to play the call(s) selected or to view their progress in any of the ways described below.

The search specification mechanism allows the user to specify:
  any required combination of call detail record parameters,
    for example call start time, campaign, wrap-up code.
    These can ultimately be expressed in, for example, an
    SQL "WHERE" clause; and
  one or more call flow parameters including one or more
    criteria of the following forms:
    calls passing through one or more specific point in the
      call flow diagram a specified number of times (including zero); and
    calls spending more or less than a specified time
      between specified points in the call flow diagram.

As users refine their search criteria, it then becomes possible to apply the new criteria to:
  the set of all calls;
  the results of the previous search; and
  the results of any earlier search.

The search itself is performed as a combination of SQL query statements selecting the set of calls that satisfy the requested call detail parameters and a process whereby the call flow record of each of these calls can be retrieved and analysed to determine whether or not the call satisfies the call flow criteria specified.

An optimisation of the above allows for more rapid responses to such searches by recording the results of commonly performed call flow record analyses and storing the results of these analyses in database tables which can then be searched efficiently using SQL queries when the system recognises one of these common search requests.

Data Visualisation Methods

Several different approaches can be used to show the callflow. Each is appropriate to a particular form of analysis or reason for using the tools. For example, a call "storyboard" can be created. Traditionally, when a call was selected for replay, a simple "slider-bar" was displayed having a pointer moving from left to right as the call is replayed. More recently, the waveform of the recording has been illustrated and silent periods highlighted. Periods of interruption and, where screen capture has been performed, the volume of on-screen activity occurring over the duration of the call has also been included in the display.

Figure 4:
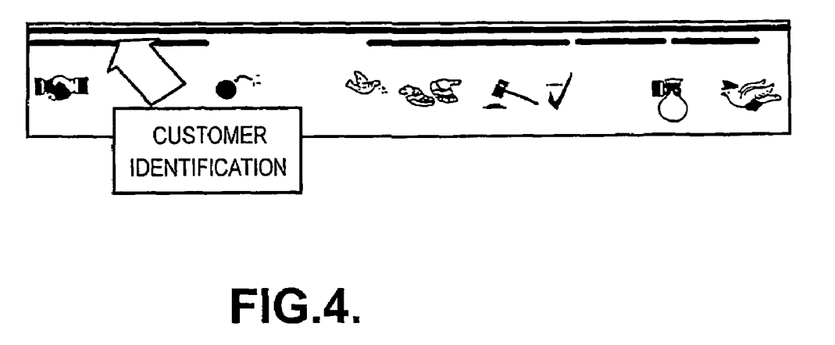
FIG. 4 is an illustration of a graphical representation of the progress of a call.

With the addition of a call flow recording, the display illustrated in FIG. 4 can be further enhanced with coloured bars indicating the progress of the call through various stages and sub-stages; pop-up text describing each stage should the user point at one of the bars; and icons signifying events during the call-including data entry.

An example of these elements as would be overlaid on the voice and screen capture waveform displays is shown in FIG. 4 with pop-up text explaining the bar being pointed to. The progress of the call is shown with the icons representing:

| | |
|---|---|
| Handshake | Customer greeting—standard salutation |
| Bomb | Customer raises complaint |
| Dove | Complaint resolved successfully |
| Open hands | New product offering explained and offered |
| Gavel | Price negotiations |
| Tick | Agreement to buy |
| Money bag | Payment terms agreed |
| Post Pigeon | Delivery details agreed |

Figure 5:
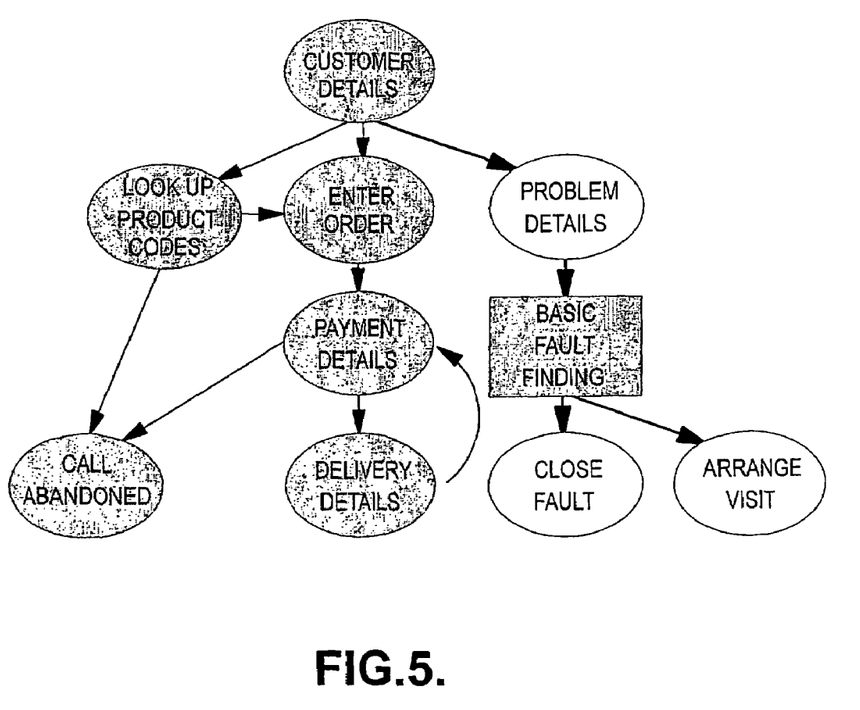
FIG. 5 is a flow diagram such as that displayed in accordance with an embodiment of the present invention to illustrate call progress.

Graphical displays such as those shown in the top-level call flow diagram FIG. 5 are used to show the user the progress of one or more selected calls through the various stages of the call handling process.

Specific features of such displays include nodes labelled to indicate the activity in progress, nodes coloured to highlight groupings (e.g. sales v service) and/or nodes shaped to distinguish between e.g. those with sub-structure within them that can be viewed by double-clicking on the node—as shown in "Basic Fault Finding" node, colours to highlight desirable/undesirable outcomes (e.g. abandoned call node), lines between nodes to show the flow of calls from one stage to another, thickness of lines proportional to the number of calls following this path, lines being coloured to highlight unexpected routes as in the backtracking from delivery details to payment details discussed below, dashed lines used to highlight available but unused paths, and nodes sized to indicate the total time spent in this particular stage of the call flow.

Figure 6:
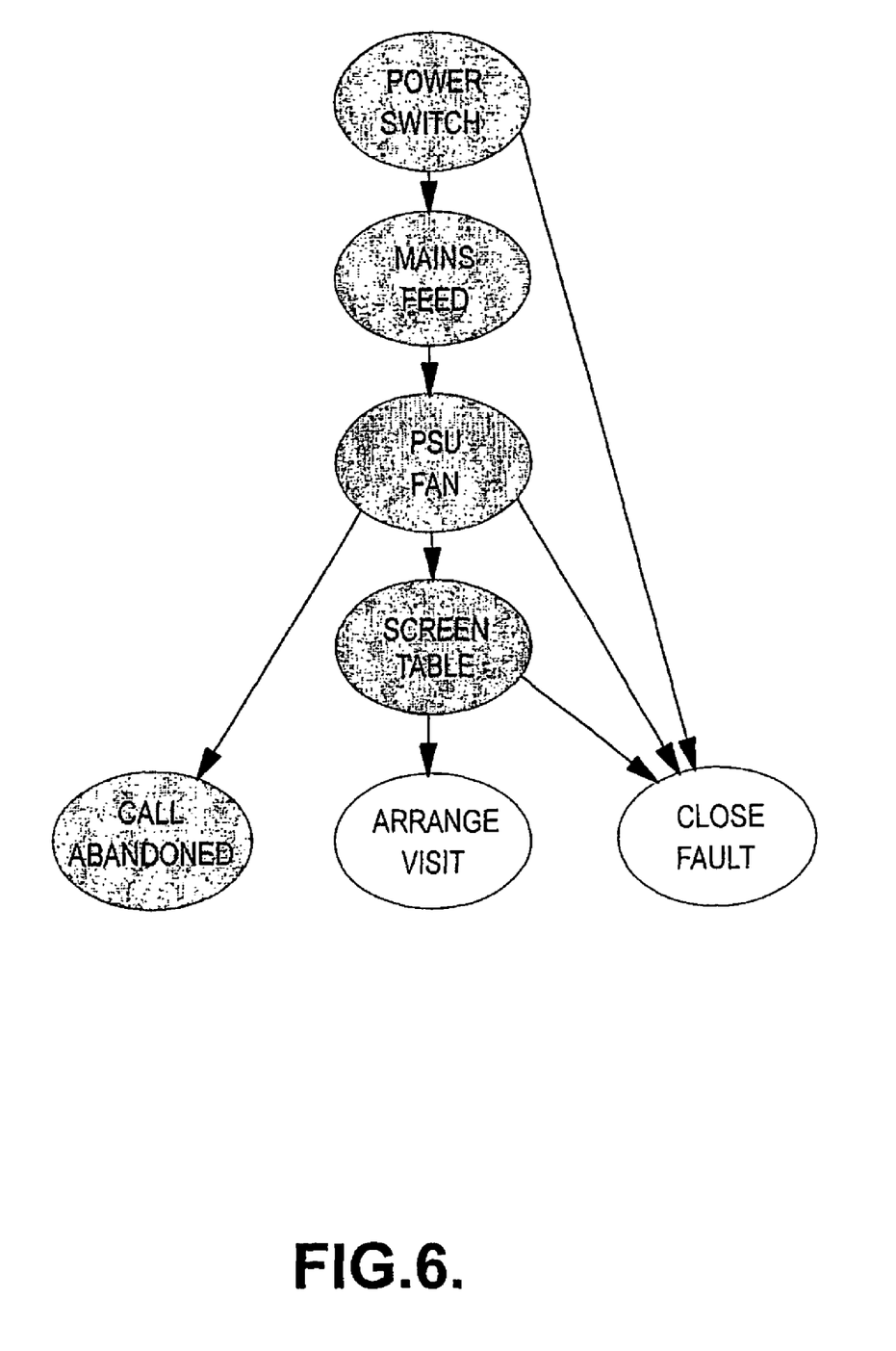
FIG. 6 is a further flow diagram derivable from the diagram of FIG. 5.

The example shown in FIG. 6 is a "drill-down" to finer detail within the "Basic Fault Finding" node of the previous diagram. In this example, the user has double clicked on the top level node to examine the detailed flow within the top-level node. This example shows by means of the dotted line, a possible call flow route that none of the selected calls took.

In this case, the user might reconsider the value of the "Mains Lead" question since it did not resolve any of the selected calls.

Drill-Down to Subset of Calls

By double clicking on one of the lines, the user can select the sub-set of calls that went via that route. The other lines in the diagram are then redrawn to show the rest of the call flow route taken by these particular calls.

Dynamic Call Flow Diagrams

Such diagrams may be static, for example showing the overall call flow for the selected set of calls. Alternatively they may be dynamic, in which the lines are added and grow thicker in real time as calls are shown to move through the call flow at N times real-time. This allows users to see bottlenecks, delays and unusually sluggish or speedy calls.

The speed at which the diagram populates can be adjusted to n times real-time where n may be 0 (paused), or a positive value or negative i.e. "rewind" value. When paused, a "single-step" mode can be invoked in which each subsequent stage of the call is shown on demand or after a fixed time regardless of the actual time it took at the time of recording.

It should be appreciated that the invention is not restricted to the details of the foregoing embodiment, the particular features of which are merely illustrative.

The invention claimed is:

1. A method comprising:
recording information associated with a communication of a call center, wherein the information recorded comprises real time or near real time information relating to the progress of the communication and wherein the progress of the communication is implicitly determined from sources relating to the communication;
identifying predefined events occurring during the communication from the information recorded, wherein the information recorded comprises at least two of the following: voice information corresponding to the communication; screen content corresponding to information displayed on a display screen of a workstation associated with the communication; and input/output information corresponding to a workstation associated with the communication;
providing a graphical user interface, the graphical user interface being configured such that, responsive to a user input designating a portion of the communication, information recorded and corresponding to that portion of the communication is presented to the user; and
displaying, via the graphical user interface, graphical indications of the identified predefined events occurring during the communication.

2. The method of claim 1, wherein the input/output information comprises at least one of: keystrokes entered at the workstation; computer mouse actions entered at the workstation; and network traffic emanating from, or terminating at, the workstation.

3. The method of claim 2, wherein the network traffic is Internet traffic.

4. The method of claim 1, further comprising forming an integrated data stream comprising at least some of the information recorded.

5. The method of claim 4, further comprising reconstructing at least a portion of the communication using the integrated data stream.

6. The method of claim 5, further comprising presenting, via the graphical user interface, information from the integrated data stream as an integrated view.

7. The method of claim 1, further comprising constructing an integrated real-time data stream comprising voice information associated with the communication and information corresponding to events that occurred during the communication.

8. The method of claim 7, further comprising enabling the communication to be reconstructed such that the information corresponding to the events is correlated with the voice information of the communication.

9. The method of claim 8, further comprising, enabling the information corresponding to the events to be presented, via the graphical user interface, with the voice information being accessible for replay responsive to user designation of a portion of the communication.

10. The method of claim 7, wherein, in the integrated real-time data stream, the information corresponding to the events is interleaved with the voice information of the communication.

11. The method of claim 1, further comprising:
automatically scoring at least a portion of the communication that was recorded.

12. The method of claim 1, wherein:
at least a portion of the information recorded is voice information corresponding to the communication; and
the method further comprises performing voice recognition analysis on at least a portion of the voice information.

13. The method of claim 1, further comprising:
analyzing, in real-time or later, keystrokes entered at a computer/terminal associated with the communication; and
inferring at least some of the events from information obtained during the analyzing.

14. The method of claim 1, further comprising:
analyzing, in real-time or later, computer mouse actions entered at a computer/terminal associated with the communication; and
inferring at least some of the events from information obtained during the analyzing.

15. The method of claim 1, further comprising:
analyzing, in real-time or later, network traffic emanating from, or terminating at, any one or more of a number of computers/terminals associated with the communication; and
inferring at least some of the events from information obtained during the analyzing.

16. The method of claim 1, further comprising:
analyzing, in real-time or later, words and/or prosody spoken during the communication; and
inferring at least some of the events from information obtained during the analyzing.

17. The method of claim 1, wherein the communication corresponds to an interaction involving an agent of a call center.

18. The method of claim 1, wherein:
at least a portion of the information recorded is voice information; and
in presenting the information recorded and corresponding to a designated portion of the communication to the user, the voice information corresponding to the designated portion is presented in audible form.

* * * * *